United States Patent [19]

Ersmambetov et al.

[11] Patent Number: 6,138,471
[45] Date of Patent: Oct. 31, 2000

[54] DEVICE FOR AIR CONDITIONING

[75] Inventors: Vjacheajav Ersmambetov, Kharkov, Ukraine; Arkady Beleski, Marblehead, Mass.

[73] Assignee: Phoenix Environmental Asset Corp., N. Kingston, R.I.

[21] Appl. No.: 09/157,432

[22] Filed: Sep. 21, 1998

[51] Int. Cl.[7] ............................................ F25D 9/00
[52] U.S. Cl. ................................................... 62/401
[58] Field of Search ............................... 62/401, 402

[56] References Cited

U.S. PATENT DOCUMENTS

| | | | |
|---|---|---|---|
| 3,828,573 | 8/1974 | Eskeli | 62/401 |
| 4,107,944 | 8/1978 | Eskeli | 62/401 |
| 4,295,518 | 10/1981 | Rannenberg | 165/2 |
| 4,550,573 | 11/1985 | Rannenberg | 62/172 |
| 5,117,655 | 6/1992 | Anderson | 62/401 |
| 5,239,833 | 8/1993 | Fineblum | 62/6 |
| 5,461,882 | 10/1995 | Zywiak | 62/401 |
| 5,628,203 | 5/1997 | Adolph et al. | 62/402 |

*Primary Examiner*—William Doerrler
*Attorney, Agent, or Firm*—I. Zborovsky

[57] ABSTRACT

An air conditioning device has two compression and expansion units connected with one another through a heat exchanger, and a mixing device arranged before the object to be air conditioned, wherein the units for expansion and compression are used at a first stage and a second stage, or for a first airstream portion and a second airstream portion.

3 Claims, 2 Drawing Sheets

DEVICE FOR AIR CONDITIONING

BACKGROUND OF THE INVENTION

The present invention relates to a device for air conditioning.

Air conditioning devices are known in the art. One of such devices disclosed in the U.S. Pat. No. 5,182,922 and includes a cooling circuit with a circulating low-boiling cooling agent which is used for a heat absorption during phase conversions for cooling. The disadvantage of the device is high ecological danger in the event of accidents and cooling agent leakage. Another air conditioning is disclosed in the publication Y. V. Zakharov "Ship Equipment for Air Conditioning and Cooling Machines" Leningrad, "Ship Building", 1979, page 112, FIG. 42. This device has a filter, an expansion unit formed as turbine, a unit for first degree air compression formed as a compressor with a drive, electric motor, and a second degree with a drive from a turbine, a heat exchanger, a mixing device arranged before an object to be air conditioned and formed as an ejector. The disadvantage of this device is a high rotary speed of the turbine shaft, which reduces service life and operational reliability of the device.

SUMMARY OF THE INVENTION

Accordingly, it is an object of the present invention to provide a new device for air conditioning which avoids the disadvantages of the prior art.

In keeping with these objects and with others which will become apparent hereinafter, one feature of present invention resides, briefly stated, in a device for air conditioning.

An air conditioner has a unit forming a first stage, the unit including a cylindrical drum provided with passages which are formed by radial blades arranged along a generatrix of the drum, a casing, and two end surfaces each provided with at least one pair of windows so that air is introduced into the passages of the cylindrical drum and is compressed by compression waves,withdrawn from the cylindrical drum, cooled, and reintroduced into the cylindrical drum to be expanded, a unit forming a second stage in which air is exclusively compressed, and mixing a unit for mixing air withdrawn from the cylindrical drum and air withdrawn from the second stage.

Since the is formed as a drum with passages in which an energy transmission is performed during a direct contact, the speed of rotation is no longer dependent on the air parameters, and therefore the speed of rotation is selected equal to the speed of the driving low or medium speed electrical engine, which is substantially lower than the speed of rotation and the analogous turbine. This provides an increase over service life of the device as well as its operational reliability and saving.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
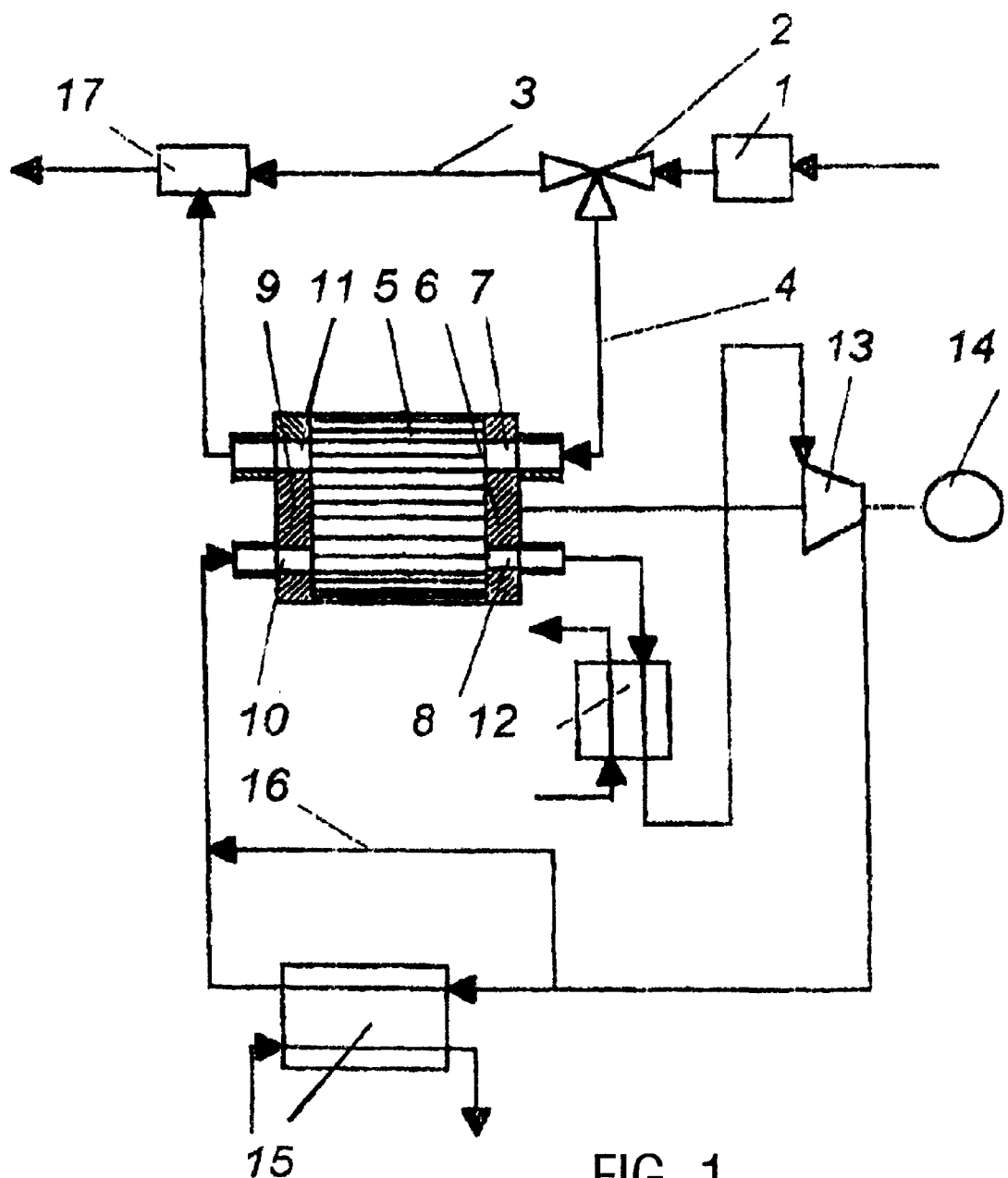
FIG. 1 is a view showing a device for air conditioning with a two-stage compression.

A device for air conditioning shown in FIG. 1 has a dust filter 1, a distributing valve 2, pipes 3 and 4, a drum with passages 5, an end surface 6 with a window 7 for low pressure air supply, and window 8 for a compressed air withdrawal and end surface 9 with the window 10 for hot-air supply and a window 11 for expanded air withdrawal, an air cooler 12, a compressor 13, an electric motor 14, an air cooler 15, a bypass pipe 16, a mixing unit 17.

The device operates in the following manner:

An airstream taken from atmosphere passes through the dust filter 1, the distributing valve 2 in which depending on the required temperature and environmental air temperature is separated into two partial airstreams. One of the partial airstreams is supplied through the pipe 3 into the mixing unit 17, while the other partial airstream is supplied through the pipe 4 into the passages of rotatable or immovable cylindrical drum. Passages are formed by radial blades arranged along a generatrix and a cylindrical casing which closes the passages along the outer diameter. Then, it is supplied through the window 7 of low pressure air provided in the movable or rotatable end surface 6. The air supplied into the passages of the drum is compressed by compression waves to an intermediate pressure, and then through the windows of compressed air withdrawal and the connected pipe is supplied into the intermediate air cooler 12. Then, a compression at the second stage is performed in the compressor 13. The compressor is driven by the electric motor which can be also formed as a drive for the drum and the end surfaces with the window. After the air compression, the air is cooled in the second air cooler 15 during a summer air conditioning mode or bypasses it in a heating mode during winter through the bypass pipe 16. The air is supplied through the windows 10 of high pressure air supply located on the end surface 9 into the passages of the drum 5, where it Is expanded by performing the work of compression of direct air stream in a direct contact with it, and then through the windows 11 for expanded air withdrawal is supplied into the mixer 17. In the mixer the cooled air (heated air during the winter mode) is mixed with the stream of atmospheric air to form a joint air stream with a required temperature, which is then supplied to an object to be air conditioned. Each end surface can have one or more window pairs.

Figure 2:
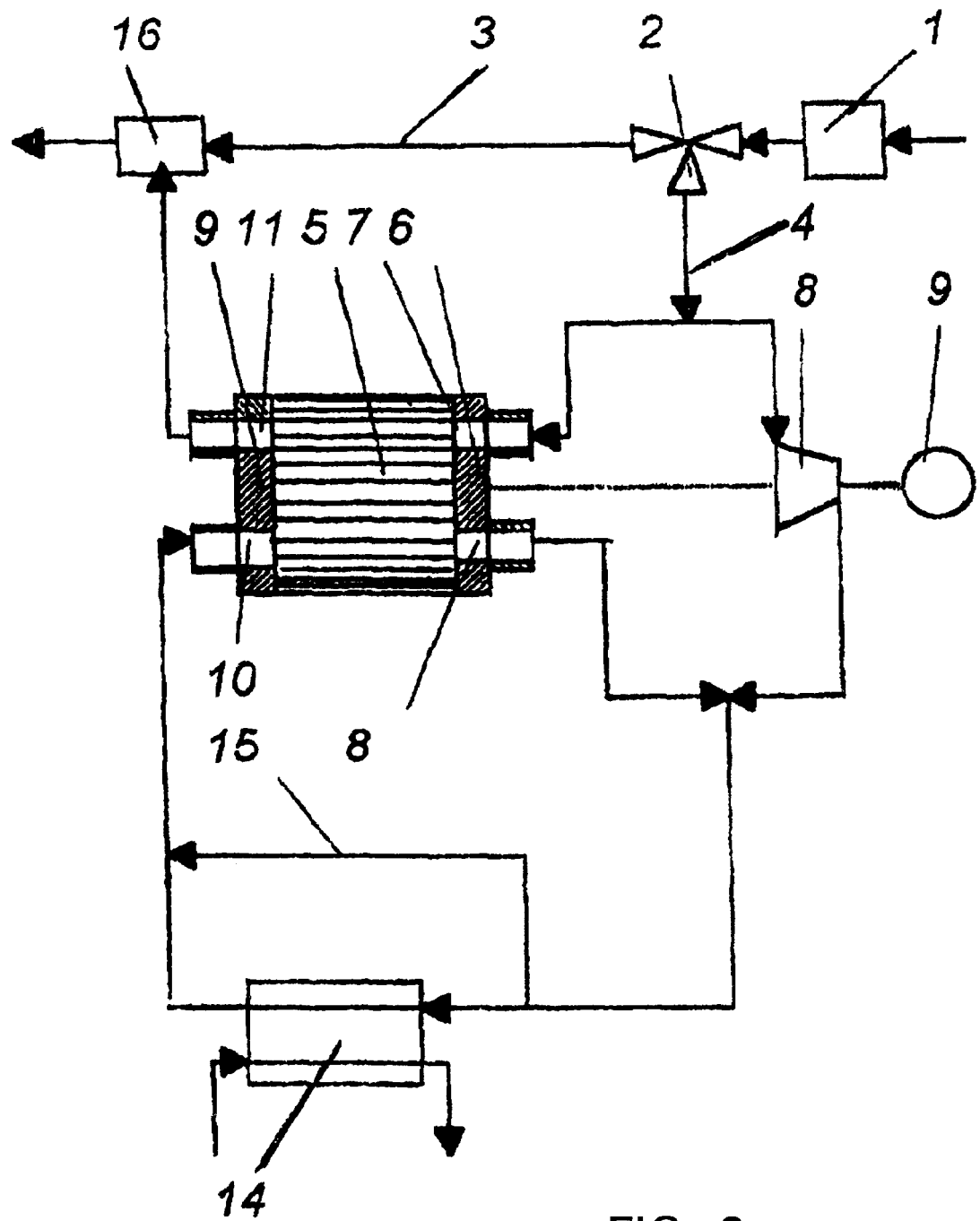
FIG. 2 is a view showing a device for air conditioning with a parallel compression.

The device shown in FIG. 2 has a dust filter 1, a distributing valve 2, pipes 3 and 4, a drum with passages 5, an end surface 6 with a window 7 for low pressure air supply and window 8 for compressed pressure withdrawal, an end surface 9 with a window 10 for high pressure air supply and a window 11 for expanded air withdrawal, a compressor 12, an electric motor 13, an air cooler 14, a bypass pipe 15, a mixing unit 16.

This device operates in the following manner. In contrast to the device shown in FIG. 1, the airstream supplied after the distributing valve 2 into the pipe 4 is subdivided into two partial airstreams. One of the partial airstreams is supplied into the passages of rotatable or immovable cylindrical drum through the windows 7 for low pressure air supply formed in the movable or rotatable end surface 6, where it is compressed by compression waves to a desired pressure at one stage and exits through the window of compressed air withdrawal and the pipe connected to it. The second partial airstream supply is supplied into the compressor 13 where it is also compressed to the same pressure, and then all partial airstreams are united. After this, the united airstream is supplied into the air cooler 15 or bypass pipe 15. The process after this is performed analogously to the process performed in the device of FIG. 1.

It will be understood that each of the elements described above, or two or more together, may also find a useful application in other types of constructions differing from the types described above.

While the invention has been illustrated and described as embodied in a device for air conditioning, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims.

What is claimed is:

1. An air conditioning device, comprising means forming a first stage, said means including a cylindrical drum provided with passages which are formed by radial blades arranged along a generatrix of said drum, a casing, and two end surfaces each provided with at least one pair of windows so that air is introduced into said passages of said cylindrical drum and is compressed by compression waves, withdrawn from said cylindrical drum, cooled, further compressed in the second stage, and reintroduced into said cylindrical drum to be expanded; and mixing means for mixing air withdrawn from said cylindrical drum and air withdrawn from said second stage.

2. An air conditioning device as defined in claim 1, wherein said second stage includes a compressor.

3. An air conditioning device comprising means forming a first stage, said means including a cylindrical drum provided with passages which are formed by radial blades arranged along a generatrix of said drum, a casing, and two end surfaces each provided with at least one pair of windows so that air is introduced into said passages of said cylindrical drum and is compressed by compression waves, withdrawn from said cylindrical drum, cooled, further compressed in the second stage, and reintroduced into said cylindrical drum to be expanded; means forming a second stage in which air is exclusively compressed; separating means subdividing an initial flow of air into a first flow which is introduced into said cylindrical drum and a second flow which is Introduced directly into said second stage; and means to combine the air from the first flow and the second flow prior to the reintroduction into the cylindrical drum to be expanded.

* * * * *